US010497221B1

(12) United States Patent
Jeon

(10) Patent No.: US 10,497,221 B1
(45) Date of Patent: Dec. 3, 2019

(54) AUTOMATED CASH RECEIVING APPARATUS

(71) Applicant: INNOSTEC CO., LTD., Daejeon (KR)

(72) Inventor: Jun Ho Jeon, Daejeon (KR)

(73) Assignee: Innostec Co., Ltd., Daejeon (KR)

( * ) Notice: Subject to any disclaimer, the term of this patent is extended or adjusted under 35 U.S.C. 154(b) by 0 days.

(21) Appl. No.: 16/183,984

(22) Filed: Nov. 8, 2018

Related U.S. Application Data

(63) Continuation of application No. PCT/KR2018/010851, filed on Sep. 14, 2018.

(30) Foreign Application Priority Data

Sep. 7, 2018 (KR) ........................ 10-2018-0107108

(51) Int. Cl.
*G06Q 40/00* (2012.01)
*G07F 19/00* (2006.01)

(52) U.S. Cl.
CPC .......... *G07F 19/202* (2013.01); *G07F 19/205* (2013.01)

(58) Field of Classification Search
USPC .......................................................... 235/379
See application file for complete search history.

(56) References Cited

U.S. PATENT DOCUMENTS 4,642,449 A * 2/1987 Baitz .................... G07G 1/0027 235/1 B
4,745,266 A * 5/1988 Miura .................... G07D 11/10 235/379
4,840,368 A * 6/1989 Uehara .................. G07D 11/12 271/162
6,276,678 B1 * 8/2001 Nottelmann ........... B65H 29/40 271/3.01
2008/0203091 A1 * 8/2008 Alhudhoud et al. .. B65F 1/1607 220/23.83
2019/0180549 A1 * 6/2019 Razzaboni ............. G07D 11/16

FOREIGN PATENT DOCUMENTS

KR 10-1781029 9/2017

* cited by examiner

*Primary Examiner* — Tuyen K Vo
(74) *Attorney, Agent, or Firm* — Harness, Dickey & Pierce, P.L.C.

(57) ABSTRACT

An automated cash receiving apparatus is provided. The automated cash receiving apparatus includes: a deposit device configured to receive and count a bill; a front case and a rear case configured to surround a front portion and a rear portion of the deposit device, respectively; a storage disposed under the deposit device to store the bill, and comprising a dropping slot to allow the bill dropping down from the deposit device to pass therethrough; a sliding frame disposed between the deposit device and the storage; and a blocking plate disposed between the sliding frame and the storage.

13 Claims, 16 Drawing Sheets

AUTOMATED CASH RECEIVING APPARATUS

CROSS-REFERENCE TO RELATED APPLICATIONS

This application is a continuation application of PCT Application No. PCT/KR2018/010851, filed on 14 Sep. 2018, which claims priority from Korean Patent Application No. 10-2018-0107108, filed on 7 Sep. 2018. The disclosures of which are incorporated herein by reference in its entirety.

FIELD

The present disclosure relates to an automated cash receiving apparatus, and more particularly, to an automated cash receiving apparatus which has an opening/closing mechanism of an enhanced structure to open/close an entrance of a bill storage box.

BACKGROUND

An automated cash receiving apparatus is similar to an automated teller machine (ATM) which automates cash withdrawals and deposits, and is an apparatus that automatically receives and stores cash such as bills or coins.

A related-art automated cash receiving apparatus generally has a bill storage box installed at a lower portion thereof to store bills, and has a deposit device installed at an upper portion thereof to insert/return and to count bills. When a user inserts a bill into the deposit device, the deposit device counts the bill and then drops the bill down to the bill storage box through a dropping slot, and stores the bill in the storage box. However, when a manager of the cash receiving apparatus opens a case of the deposit device for a certain reason such as repair of the deposit device, the entrance (dropping slot) of the bill storage box should be closed to prohibit the manager from touching the bills through the entrance.

The related-art cash receiving apparatus has a cover plate configured to be electronically operated by a driving motor, etc. to open and close the entrance of the bill storage box, and, when the case of the deposit device is opened, the driving motor is driven to close the entrance of the bill storage box. However, this electronic method may frequently cause an error, and, when an error occurs, the whole cash receiving apparatus may not work.

SUMMARY

The present disclosure has been developed to solve the above-described problems, and an object of the present disclosure is to provide an automated cash receiving apparatus which is configured to open and close a dropping slot in a mechanical method by combining an operation of drawing out a deposit device forward and an operation of closing the dropping slot of a bill storage, and mechanically opens and closes the dropping slot with a simple structure without a separate electronic device.

According to an embodiment of the present disclosure, an automated cash receiving apparatus include: a deposit device configured to receive and count a bill; a front case and a rear case configured to surround a front portion and a rear portion of the deposit device, respectively; a storage disposed under the deposit device to store the bill, and including a dropping slot to allow the bill dropping down from the deposit device to pass therethrough; a sliding frame disposed between the deposit device and the storage; and a blocking plate disposed between the sliding frame and the storage, wherein the sliding frame is coupled to the deposit device, and is slidable forward and backward integrally with the deposit device, and the blocking plate is coupled to a lower portion of the sliding frame, and is slidable forward and backward relative to the sliding frame, wherein, when the deposit device is driven, the sliding frame and the blocking plate retreat, respectively, such that the dropping slot is opened, wherein, when the deposit device is drawn out forward in an idle state, the blocking plate slides forward, and closes an upper portion of the dropping slot.

According to an embodiment of the present disclosure, the deposit device may include: an upper bill insertion slot; a counting device disposed under the bill insertion slot to count an inserted bill; a bill dispensing slot disposed in front of the counting device; and a bill queue module disposed under the counting device to temporarily accommodate the bill passing through the counting device.

According to an embodiment of the present disclosure, the bill queue module may include: a bill seating portion on which the bill passing through the counting device is laid; a horizontal plate disposed under the bill seating portion; a vertical plate coupled to the horizontal plate at a front end of the horizontal plate; a sliding plate disposed on a front portion of the vertical plate and slidable up and down; one or more protrusions coupled to upper portions of the sliding plate by means of a hinge; and a driving motor disposed behind the vertical plate to slide the sliding plate.

According to an embodiment of the present disclosure, the dropping slot is opened/closed in a mechanical method by combining the operation of drawing out the deposit device and the operation of closing the dropping slot. Therefore, the structure is simpler than a related-art structure, and the dropping slot can be opened/closed more surely without causing a breakdown.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
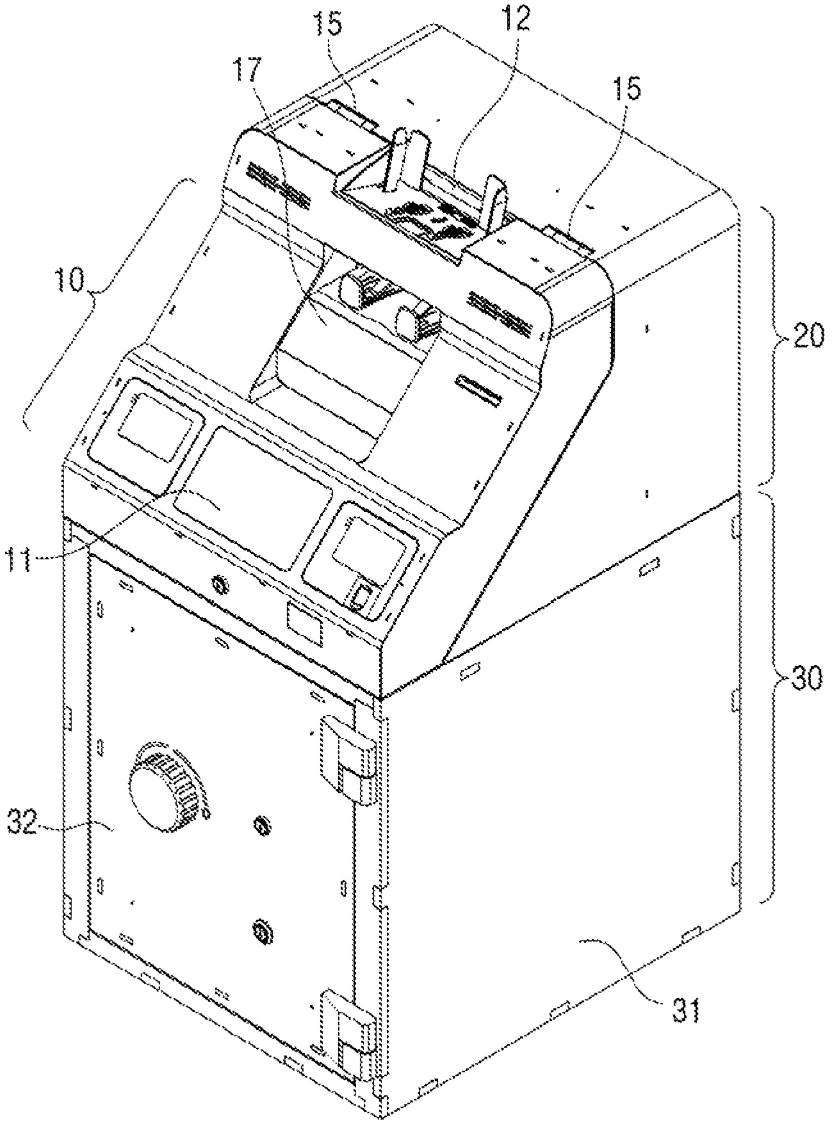
FIG. 1 is a perspective view illustrating an automated cash receiving apparatus according to an embodiment of the present disclosure.

Exemplary embodiments will now be described more fully with reference to the accompanying drawings to clarify aspects, other aspects, features and advantages of the inventive concept. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

It will be understood that when an element is referred to as being "on" (or "under", "on the right of", or "on the left of") another element, the element can be directly on (or "under", "on the right of", or "on the left of") another element or intervening elements. In the drawings, length or thickness of elements are exaggerated for easy understanding of technical features.

The expressions such as "upper", "lower", "left", "right", "front", "rear", etc. used in the specification to explain a location relationship between elements do not mean a directions or location as an absolute criterion, and are relative expressions used for convenience of explanation with reference to a corresponding drawing when the present disclosure is explained with reference to each drawing.

If the terms such as 'first' and 'second' are used to describe elements, these elements should not be limited by such terms. These terms are used for the purpose of distinguishing one element from another element only. The exemplary embodiments include their complementary embodiments.

As used herein, the singular forms are intended to include the plural forms as well, unless the context clearly indicates otherwise. It will be further understood that the terms "comprise" and/or "comprising," when used in this specification, do not preclude the presence or addition of one or more other components.

Figure 2:
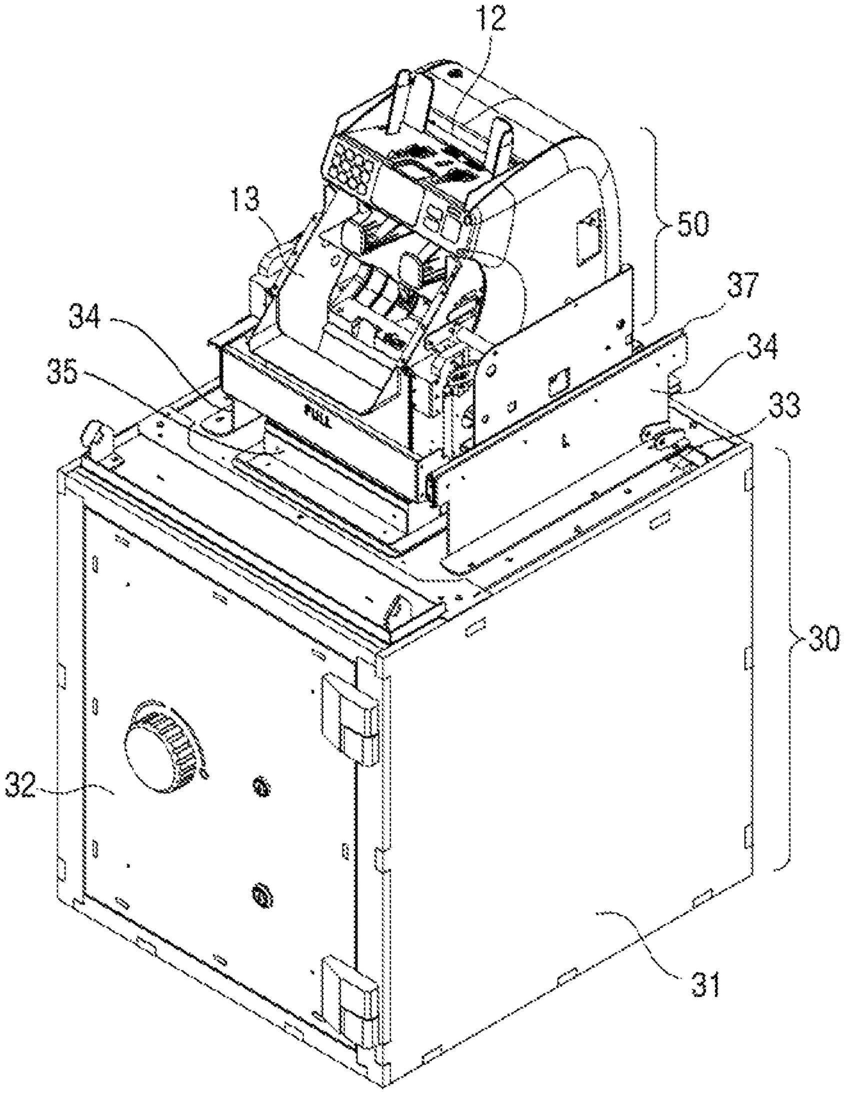
FIG. 2 is a perspective view illustrating the automated cash receiving apparatus with an upper case removed according to an embodiment.

FIG. 1 is a perspective view illustrating an automated cash receiving apparatus according to an embodiment of the present disclosure, and FIG. 2 is a perspective view illustrating the automated cash receiving apparatus with an upper case 10, 20 removed.

Referring to FIGS. 1 and 2, the cash receiving apparatus according to an embodiment may include an upper case 10, 20 and a lower storage 30, and a deposit device 50 disposed in the case.

The upper case according to an embodiment may include a front case 10 and a rear case 20. The rear case 20 may be coupled and fixed to an upper portion of the storage 30. The front case 10 may be coupled to the rear case 20 by means of a hinge 15, for example, and accordingly, the front case 10 may be raised to be opened.

The front case 10 may have a control panel 11 installed thereon and including a touch screen and/or a plurality of buttons, and a user may put in cash such as bills or vouchers (hereinafter, referred to as "bill") by using the control panel 11.

Figure 8:
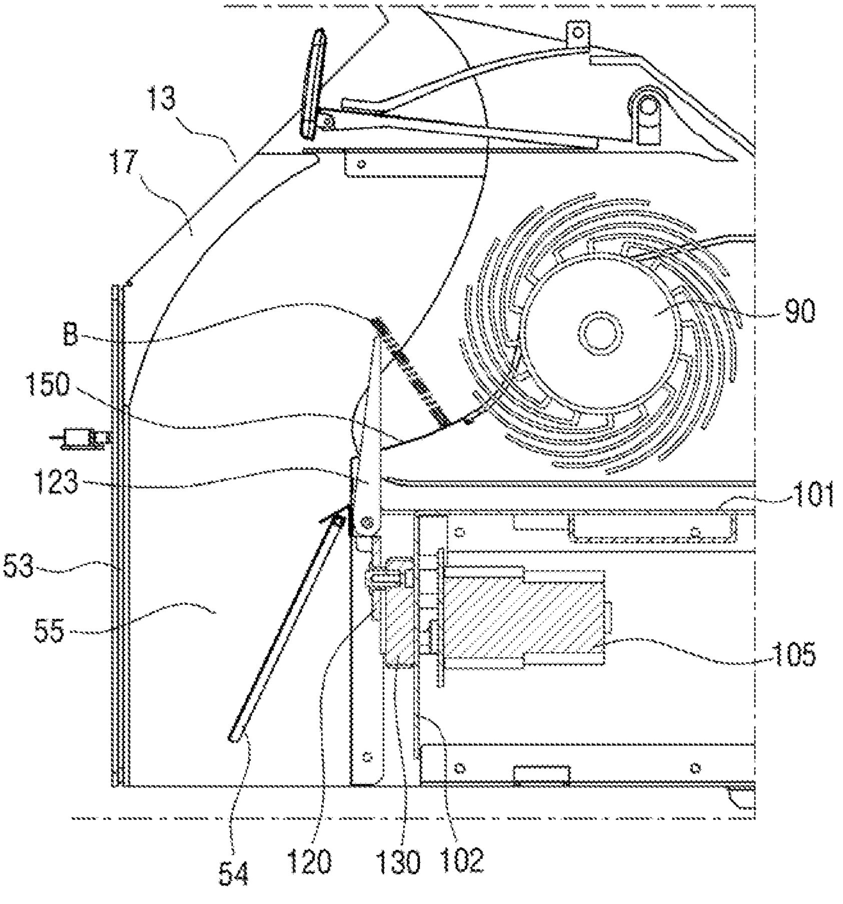
FIG. 8 is a view to illustrate a bill queue mode of the bill queue module.

In an embodiment, the deposit device 50 may include a bill insertion slot 12, a bill dispensing slot 13, a counting device 90, and a bill queue module 100. The bill insertion slot 12 may be disposed on an upper portion of the front case 10. As shown in FIG. 8, the counting device 90 is disposed under the bill insertion slot 12 to count inserted bills, and the bill dispensing slot 13 is installed in front of the counting device 90 to return bills. The bill queue module 100 is a module for accommodating bills until a final deposit command is received from the user, and may be disposed under the counting device 90 in an embodiment (see FIG. 3).

When the user inserts a bill into the deposit device 50 through the bill insertion slot 12, the bill is conveyed to the counting device 90 and is counted thereat, and the counted bill is seated on the bill queue module 100 and queues. When a final deposit command is received from the user through the control panel 11, the deposit device 50 conveys the bill to the storage 30 through a dropping slot 35 formed on an upper portion of the storage 30.

In an embodiment, the deposit device 50 may determine whether the corresponding bill is a counterfeit bill or is severely damaged, and may return, to the user, a bill that is inappropriate to be conveyed to the storage 30 for reasons of counterfeit or damage, through the bill dispensing slot 13.

In an embodiment, the storage 30 is a device which accommodates and stores bills, and may include a storage box 31 formed in a substantially cuboidal shape, such as a safe-like shape, and a door 32 installed on one side surface of the storage box 31. The dropping slot 35 may be formed on an upper plate 33 formed on the upper portion of the storage box 31 to allow a bill dropping down from the deposit device 50 to pass therethrough.

Referring to FIG. 2, deposit device support plates 34 are disposed on left and right sides of the upper plate 33 of the storage box 31 perpendicular to the upper plate 33. Sliding bar support rails 37 are coupled to insides of the deposit device support plates 34, one or more sliding bars are slidably attached to an inside of each of the support rails 37, and the deposit device 50 is configured to be coupled to the sliding bars. Accordingly, the deposit device 50 may be supported on the upper portion of the storage 30 by means of the support plates 34 and the support rails 37, and may slide forward and backward (i.e., in the left, downward and right, upward directions in the drawing).

Figure 3:
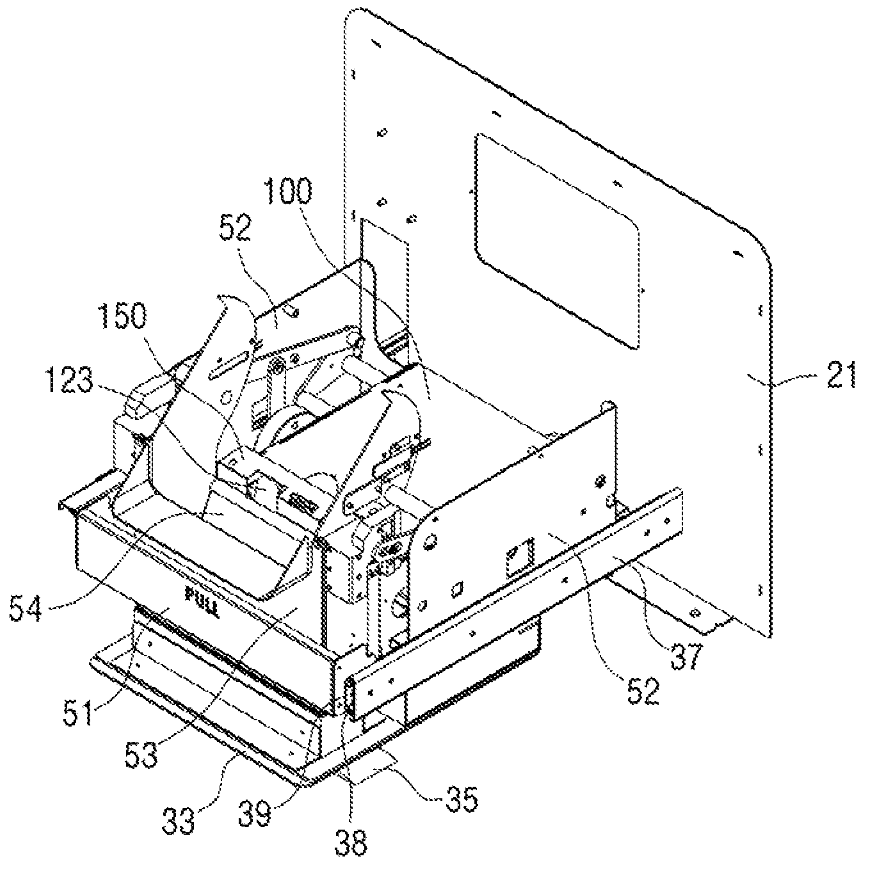
FIG. 3 is a view illustrating a portion of a deposit device according to an embodiment.

FIG. 3 illustrates an example of a coupling structure of the deposit device 50 and the support plate 34 according to an embodiment. For convenience of explanation, only a portion of the deposit device 50 is illustrated.

In an embodiment, the deposit device 50 may include the counting device 90 (see FIG. 8) to count bills, the bill queue module 100 disposed under the counting device 90, and a plurality of frames surrounding the counting device 90 and the bill queue module 100. In the illustrated embodiment, the bill queue module 100 of the deposit device 50 is surrounded by a front frame 51 and side surface frames 52. The front frame 51 is disposed on a front portion of the bill queue module 100, and the side surface frames 52 are disposed on left and right sides of the bill queue module 100.

A dropping passage 55 may be formed between the bill queue module 100 and the front frame 51 to allow a bill to be dropped down to the dropping slot 35 (see FIG. 8), and to achieve this, a passage front panel 53 and a passage rear panel 54 are disposed between the bill queue module 100 and the front frame 51 to form the dropping passage 55. The dropping passage 55 is aligned to be located right over the dropping slot 35 when the deposit device 50 is driven.

Referring to FIGS. 2 and 3, the deposit device support plates 34 are disposed on left and right sides of the upper plate 33 of the storage 30, and the sliding bar support rails 37 are attached to the insides of the support plates 34. A first sliding bar 38 is coupled to the inside of each of the sliding bar support rails 37 to be slidable forward and backward along the support rail 37. A second sliding bar 39 is coupled to the inside of the first sliding bar 38 to be slidable forward and backward along the first sliding bar 38, and the second sliding bar 39 is integrally coupled to the side surface frame 52 of the deposit device 50. According to the above-described configuration, the deposit device 50 is supported on the upper portion of the storage 30 by means of the deposit device support plates 34, and is configured to be slidable forward and backward by means of the first and second sliding bars 38, 39.

Hereinafter, the bill queue module 100 will be described with reference to FIGS. 4 to 7.

Figure 4:
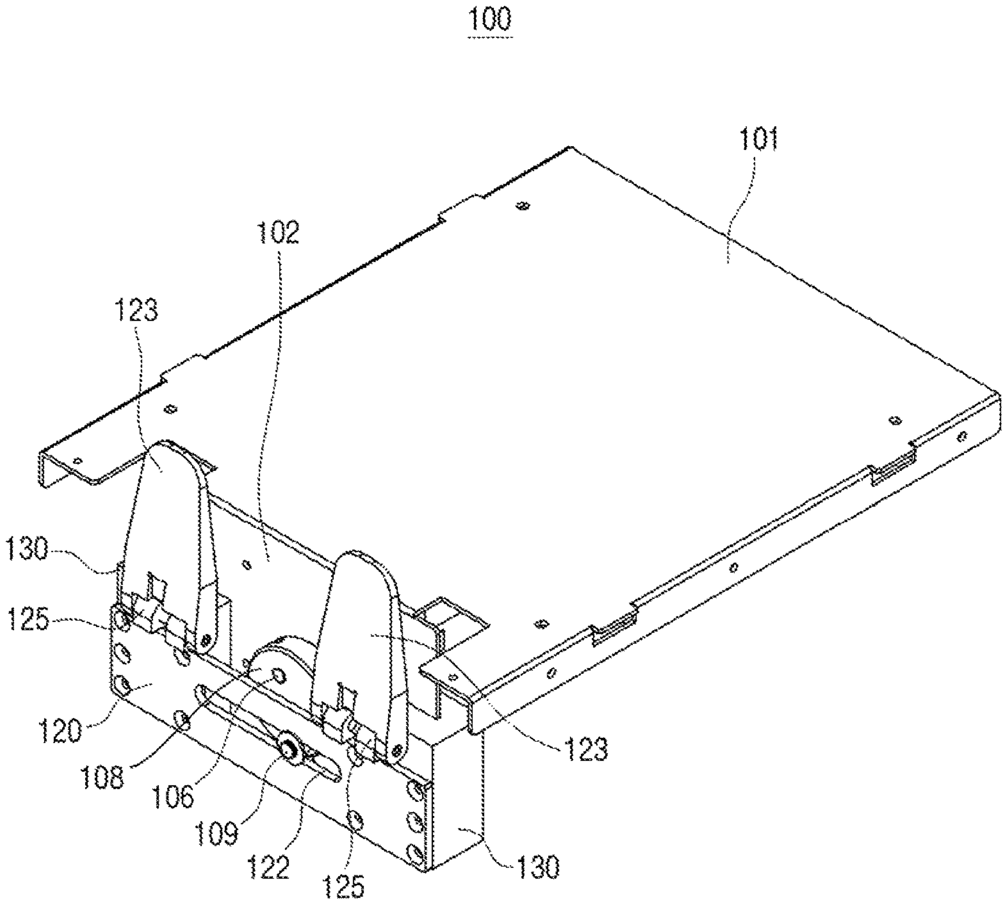
FIGS. 4 and 5 are perspective views illustrating a bill queue module according to an embodiment.
Figure 5:
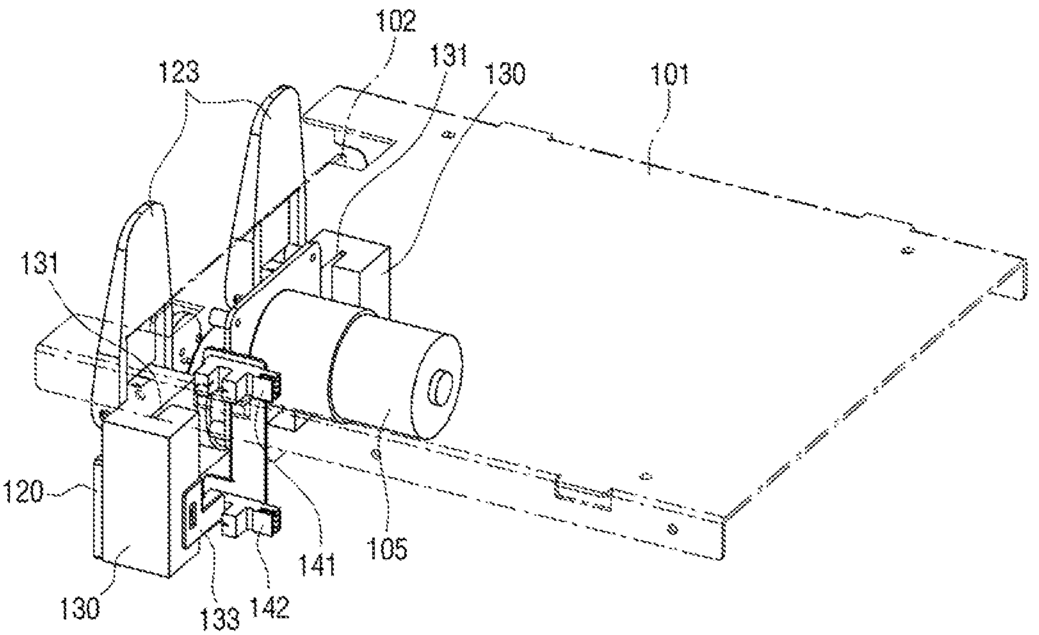

FIGS. 4 and 5 are perspective views illustrating the bill queue module from different angles according to an embodiment. In an embodiment, the bill queue module 100 may include a horizontal plate 101, a vertical plate 102, a driving motor 105, a sliding plate 120, one or more protrusions 123, and a bill seating portion 150.

The bill seating portion 150 is a member on which a bill passing through the counting device 90 is laid, and may be disposed under the counting device 90 in an embodiment (see FIGS. 3 and 8). The bill seating portion 150 may be formed of a substantially horizontal plate or an inclined plate having its height increased toward the rear portion.

The horizontal plate 101 is disposed under the bill seating portion 150, and the vertical plate 102 is coupled to the horizontal plate 101 at a front end of the horizontal plate 101 and extends downward. The horizontal plate 101 and the vertical plate 102 may be integrally formed with each other, or may be separately formed and may be attached to each other.

The sliding plate 120 is disposed on a front portion of the vertical plate 102, and is configured to slide up and down along the vertical plate 102. The sliding plate 120 may be a plate which is long in the horizontal direction, and may have a slot 122 formed at a center thereof in the horizontal direction.

One or more protrusions 123 are coupled to upper portions of the sliding plate 120. In an embodiment, the protrusions 123 are coupled to the sliding plate 120 by means of hinges 125. Preferably, an elastic member such as a spring may be provided in the hinge 125, and accordingly, even when the protrusion 123 pivots, the protrusion 123 may return to its original upright position due to elasticity of the elastic member.

The driving motor 105 is disposed under the horizontal plate 101, that is, behind the vertical plate 102. A cam 108 is interposed between the sliding plate 120 and the vertical plate 102, and a driving shaft 106 of the driving motor 105 penetrates through the vertical plate 102 and is coupled to the cam 108. A projection 109 protrudes from a front surface of the cam 108 and is slidably inserted into the slot 122 of the sliding plate 120. According to this configuration, when the driving shaft 106 is rotated by driving of the driving motor 105, the cam 108 rotates and the projection 109 moves horizontally in the slot 122, such that the sliding plate 120 slides up and down.

In an embodiment, the bill queue module 100 may further include guide portions 130 to guide the sliding operation of the sliding plate 120. In the illustrated embodiment, the guide portions 130 may be attached to the left and right sides of the sliding plate 120. Each guide portion 130 may have a guide recess 131 formed on one side surface thereof in the vertical direction, and the guide recess 131 is formed to surround a portion of the side surface of the vertical plate 102. Accordingly, the guide portions 130 and the sliding plate 120 integrally coupled thereto are guided by the side surfaces of the vertical plate 120 and are slidable up and down.

Figure 6:
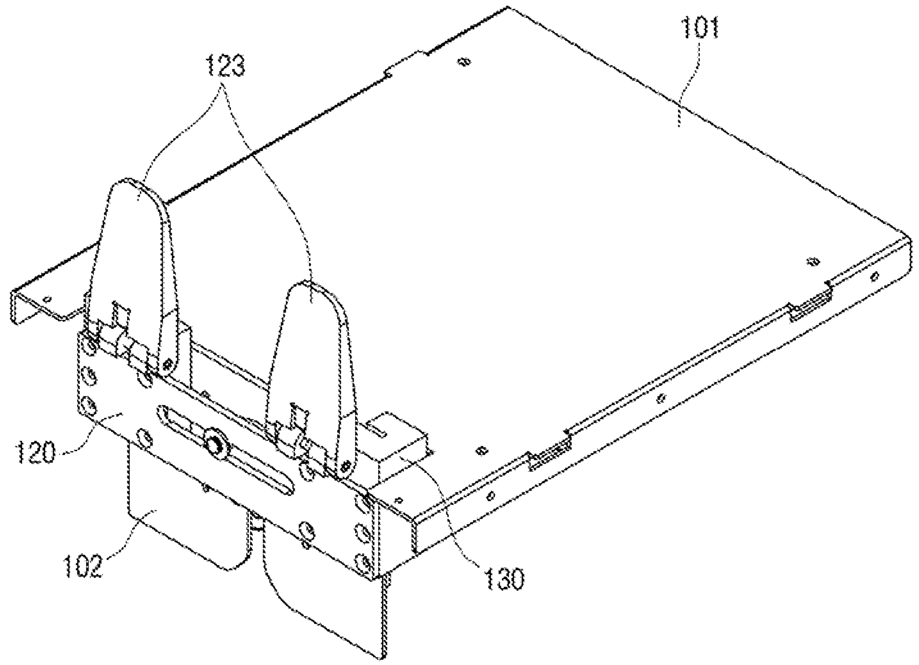
FIGS. 6 and 7 are perspective views to illustrate an operation of the bill queue module.
Figure 7:
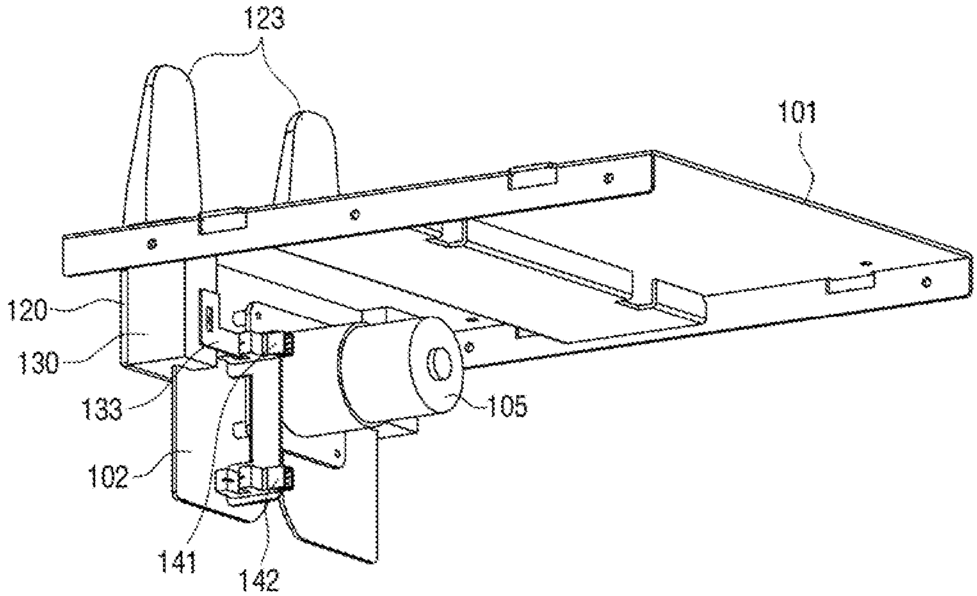

FIGS. 6 and 7 are perspective views illustrating an operation of the bill queue module, and illustrate the bill queue module from different angles when the sliding plate 120 ascends. It can be seen that the cam 108 is rotated by driving of the driving motor 105, and the projection 109 moves in the slot 122 and the sliding plate 120 ascends.

In the illustrated embodiment, the bill queue module 100 may further include a height detection sensor to detect a maximum ascending position and a maximum descending position of the sliding plate 120 and to control the operation of the driving motor 105. In an embodiment, the height detection sensor may include a detection plate 133 attached to the guide portion 130, and an upper sensor 141 and a lower sensor 142 which are attached to the vertical plate 102.

The upper sensor 141 and the lower sensor 142 are installed at heights corresponding to the maximum ascending position and the maximum descending position of the sliding plate 120, respectively. The sensors 141, 142 may operate in one of well-known various sensing methods, and in the illustrated embodiment, light sensors may be used and may detect the detection plate 133 attached to the guide portion 130.

Accordingly, when a controller (not shown) drives the driving motor 105 and raises the sliding plate 120, the upper sensor 140 may detect the detection plate 133 and transmit a detection signal to the controller. The controller may recognize that the sliding plate 120 reaches the maximum ascending position, and may stop driving the driving motor 105. Likewise, when the lower sensor 132 detects the detection plate 133, the controller may recognize that the sliding plate 120 reaches the maximum descending position, and may stop driving the driving motor 105.

The bill queue module 100 configured as described above may operate in a bill queue mode, a bill dropping mode, and a bill return mode, and hereinafter, the operation of the bill queue module 100 will be described with reference to FIGS. 8 to 10.

FIG. 8 illustrates the bill queue mode of the bill queue module. The bill queue mode is a mode in which a bill is temporarily accommodated before a bill deposit completion instruction is received from a user and the bill is dropped down to the storage 30.

Referring to the drawing, the counting device 90 and the bill queue module 100 disposed thereunder are illustrated, and the dropping passage 55 is disposed in a front portion (left side in the drawing) of the bill queue module 100. The bill dispensing slot 13 is disposed at an upper portion of the front portion of the bill queue module 100 to dispense bills, and is closed by a dispensing slot cover 17 in the bill queue mode.

In the bill queue mode, the sliding plate 120 and the protrusion 123 are positioned at the maximum ascending position. The bill B passing through the counting device 90 is laid on the bill seating portion 150 between the protrusion 123 and the counting device 90. In this case, the bill B does not lie flat on a bottom of the seating portion 150 and stands aslant as shown in the drawing. That is, one corner of the bill B is in contact with the bottom surface of the seating portion 150 and the opposite corner is placed adjacent to the upper end of the protrusion 123.

Figure 9:
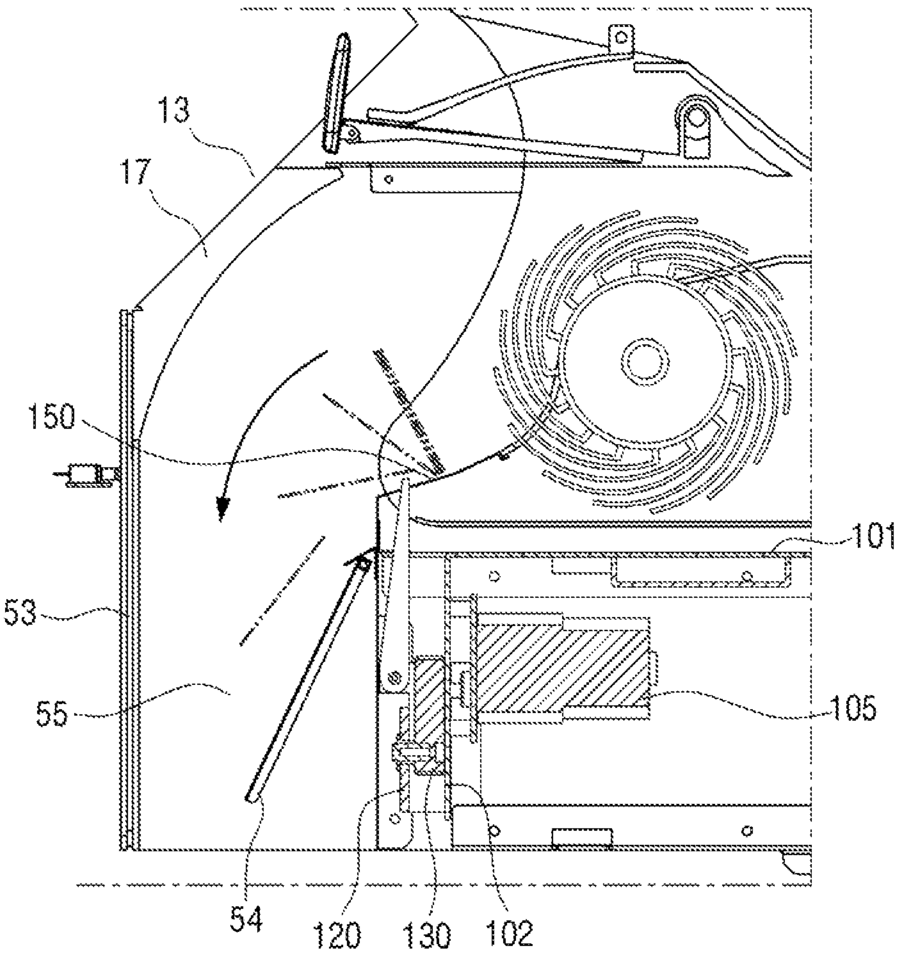
FIG. 9 is a view to illustrate a bill dropping mode of the bill queue module.

In this state, when the user enters a deposit completion command through the control panel 11, the bill dropping mode is activated and the bill is dropped down to the dropping passage 55 as shown in FIG. 9. Referring to FIG. 9, in the bill dropping mode, the sliding plate 120 descends to the maximum descending position by driving of the driving motor 105. Since the protrusion 123 supporting the bill B also descends, the bill B drops down to the dropping passage 55 and the dropping slot 35 of the storage 30 disposed thereunder due to self-weight of the bill B.

Figure 10:
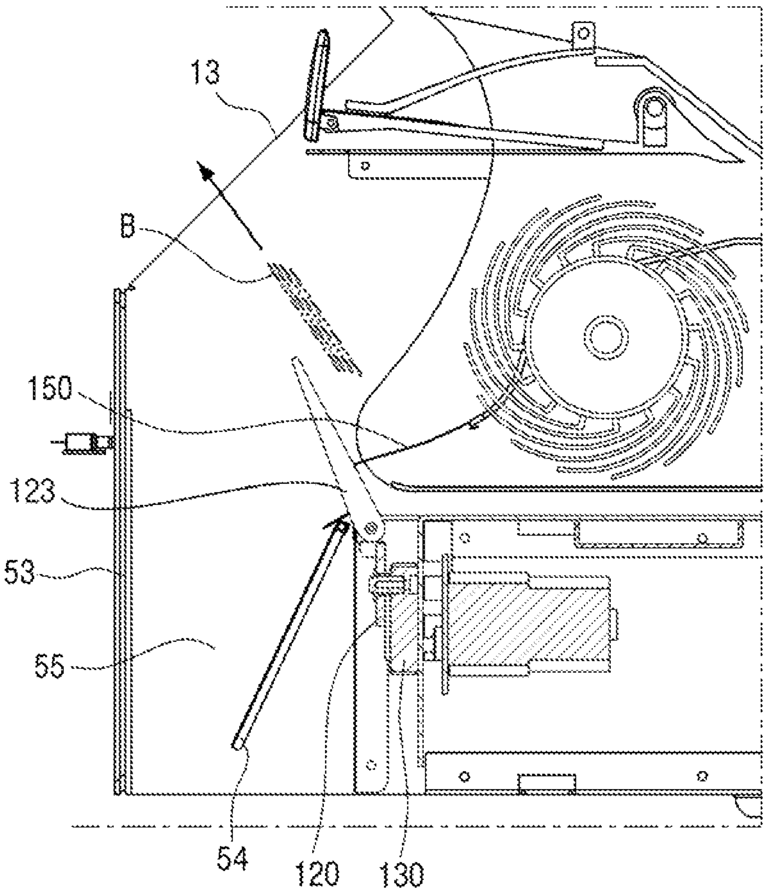
FIG. 10 is a view to illustrate a bill return mode of the bill queue module.

FIG. 10 illustrates the bill return mode of the bill queue module. The bill return mode is a mode in which a bill is accommodated until the bill is withdrawn by the user according to a deposit cancellation command. In this case, the deposit cancellation command may be generated when the user enters the deposit cancellation command through the control panel 11 to cancel the deposit. In another example, the deposit device 50 may examine whether the bill is counterfeited, damaged, and/or conforms to a predefined bill format, and the deposit cancellation command may be generated when the bill does not pass the examination. The controller (not shown) which receives the deposit cancellation command maintains the sliding plate 120 at the maximum ascending position, and simultaneously, opens the dispensing slot cover 17.

Similarly to the bill queue mode, the bill B stands aslant on the bill seating portion 150 between the protrusion 123 and the counting device 90 in the bill return mode. Accordingly, the user may draw out the bill through the bill dispensing slot 13. In this case, since the protrusion 123 is coupled to the sliding plate 120 by means of a hinge, the protrusion 123 may slightly pivot as shown in the drawing, and may be configured not to interfere with withdrawing by the user.

As described above, the bill B stands aslant between the protrusion 123 and the seating portion 150 in the bill queue mode, and is dropped down to the dropping slot 35 simply by lowering the protrusion 123 in the dropping mode. Therefore, a separate device for dropping the bill is not required, and the bill queue module can switch between the bill queue mode and the bill dropping mode by a relatively simple configuration.

In addition, the dispensing slot cover 17 is simply opened to return the bill, and the protrusion 123 is configured to be pivotable by hinge coupling. Therefore, the bill is not required to be conveyed to a separate return passage to be returned, and thus there are advantages that the structure for returning a bill is simple and does not interfere with user's operation when returning the bill.

Hereinafter, a blocking structure for opening and closing the dropping slot 35 will be described with reference to FIGS. 11 to 18.

Figure 11:
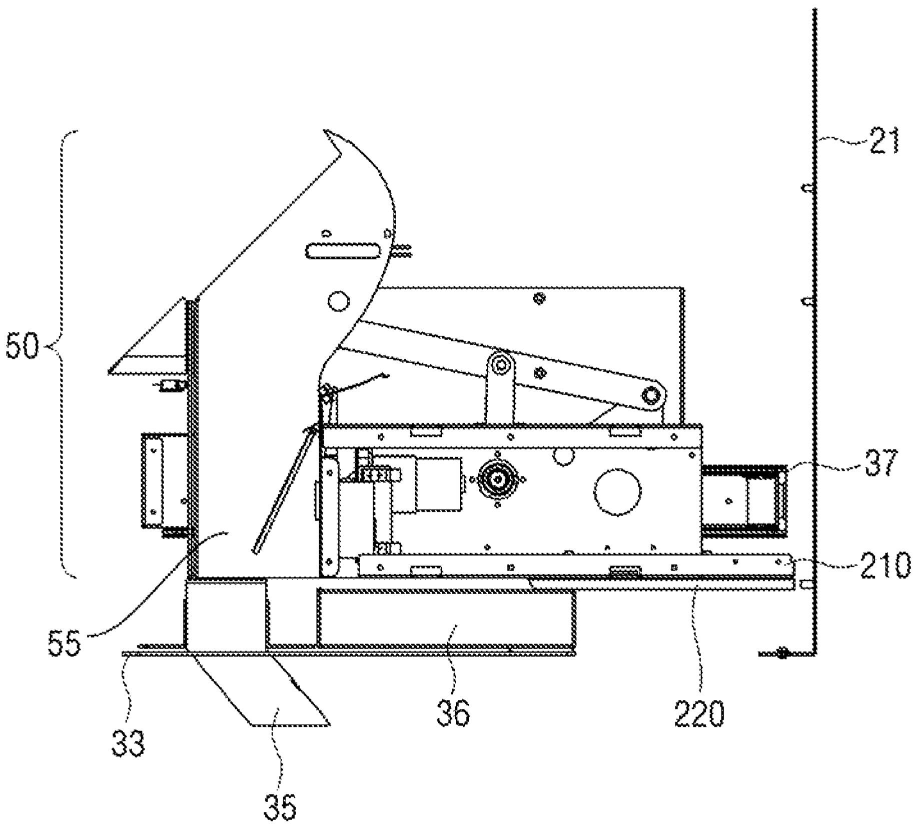
FIGS. 11 and 12 are views illustrating a state before the deposit device is drawn out.
Figure 12:
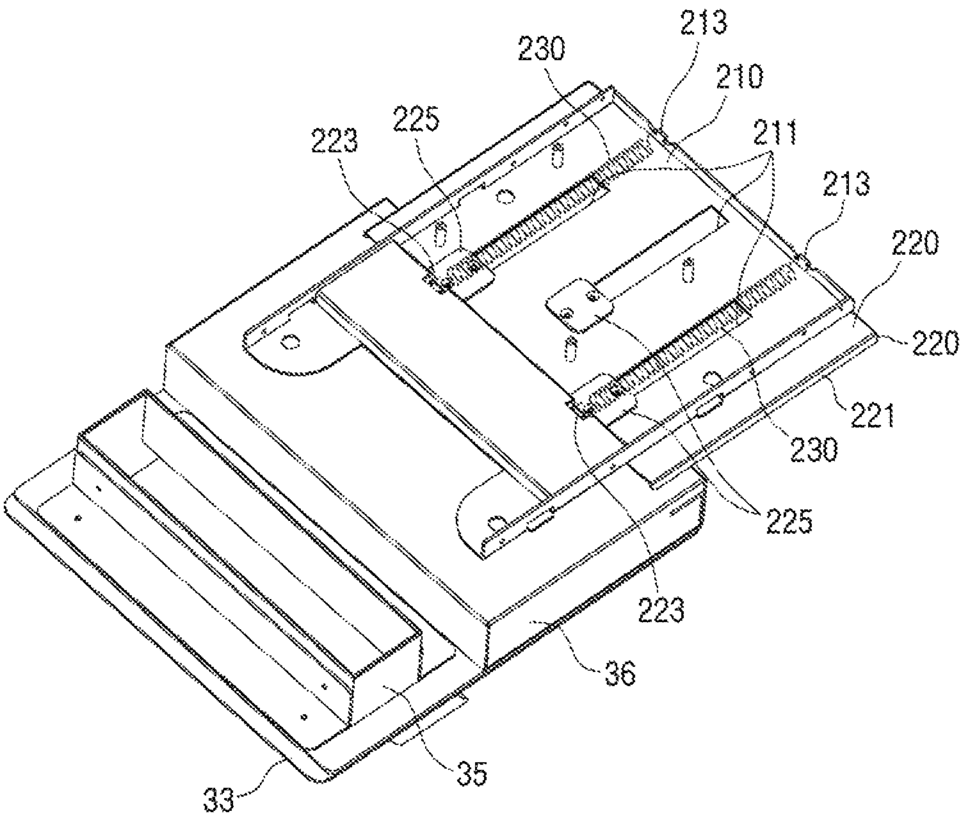

FIGS. 11 and 12 are views illustrating a state before the deposit device slides and is drawn out (pulled forward). FIG. 11 is a side cross-sectional view, and FIG. 12 is a perspective view illustrating a sliding frame 210 and a blocking plate 220. It will be understood that, for convenience of explanation, elements having nothing to do with the opening/closing operation of the dropping slot 35 are not illustrated.

Referring to FIG. 11, the deposit device 50 is slidably supported on the sliding bar support rails 37. This structure has been described with reference to FIGS. 2 and 3, and thus a description thereof is omitted. A rear vertical plate 21 is installed behind the deposit device 50. The rear vertical plate 21 may be an inner surface of the rear case 20 or a separate plate installed inside the rear case 20. FIG. 11 (and FIGS. 14 and 17) illustrates the rear vertical plate 21 to show whether the deposit device 50 is drawn out.

The blocking structure for opening and closing the dropping slot 35 includes the sliding frame 210 and the blocking plate 220. The sliding frame 210 and the blocking plate 220 are disposed between the deposit device 50 and the storage 30. In the illustrated embodiment, the sliding frame 210 is coupled to the deposit device 50 and is configured to be slidable forward and backward (in the horizontal direction in the drawing) integrally with the deposit device 50. The blocking plate 220 is coupled to a lower portion of the sliding frame 210. The blocking plate 220 is coupled to be slidable forward and backward relative to the sliding frame 210. Accordingly, when the deposit device 50 is drawn out in an idle state, the blocking plate 220 slides forward and closes the upper portion of the dropping slot 35.

The dropping slot 35 is formed on the upper plate 33 of the storage 30, and a support 36 is installed behind the dropping slot 35. The support 36 may support the blocking plate 220, and alternatively, a guide recess may be provided to guide the sliding operation of the blocking plate 220. In another embodiment, the support 36 may be omitted.

Referring to FIG. 12, the sliding frame 210 includes one or more slots 211 formed on a surface thereof in forward and backward directions (i.e., in longitudinal direction). In the illustrated embodiment, three slots 211 are provided, but, according to a specific embodiment, the number of slots 211 may vary.

The blocking plate 220 is disposed on a lower portion of the sliding frame 210. The blocking plate 220 includes one or more protrusions 225 integrally coupled to the blocking plate 220 and penetrating through the slots 211 of the sliding frame 210. In this case, the protrusion 225 may be formed to have an upper end wider than the width of the slot 211, such that the blocking plate 220 can slide forward and backward along the slot 211 without being separated from the sliding frame 210. That is, the blocking plate 220 is coupled to the lower portion of the sliding frame 210 and is slidable forward and backward relative to the sliding frame 210. In addition, it will be understood that a distance by which the blocking plate 220 slides is determined according to a length of the slot 211.

In the illustrated embodiment, side surface bending portions 221 which bend downward are formed on both side surfaces of the blocking plate 220, and a rear bending portion 222 bending downward is formed on a rear end of the blocking plate 220. In an embodiment, lower ends of the side surface bending portions 221 and the rear bending portion 222 may be lower than a level of an upper end of the dropping slot 35. Accordingly, when the blocking plate 220 continuously slides forward, the rear bending portion 222 collides with the upper end of the dropping slot 35 and thus the blocking plate 220 does not advance further. Therefore, the rear bending portion 222 may serve as a stopper to restrict the forward sliding movement of the blocking plate 220.

The blocking structure for opening/closing the dropping slot according to a preferred embodiment includes one or more elastic members 230 connecting the sliding frame 210 and the blocking plate 220. In the illustrated embodiment, the elastic member 230 is a spring. In an alternative embodiment, other elastic members such as a rubber band or etc. may be used.

In the illustrated embodiment, the elastic member 230 has one end coupled to a locking portion 213 of the rear portion of the sliding frame 210, and has the other end coupled to a locking portion 223 of the front portion of the blocking plate 220, thereby elastically coupling the sliding frame 210 and the blocking plate 220.

FIGS. 11 and 12 illustrate a state in which the deposit device 50 is not drawn out forward, and the sliding frame

210 and the blocking plate 220 are pushed backward to the maximum. As shown in FIG. 11, the dropping slot 35 is located right under the dropping passage 55 and is opened. In addition, as shown in FIG. 12, the elastic member 230 is stretched to the maximum and thus a tensile force is applied to the elastic member 230. In this case, the rear end of the blocking plate 220 is blocked by the vertical plate 21 of the rear case 20 and does not move backward. Therefore, the tensile force of the elastic member 230 is applied to let the sliding frame 210 slide forward. However, since the deposit device 50 integrally coupled to the sliding frame 210 is heavy, the sliding frame 210 does not move although the tensile force of the elastic member 230 is applied.

Now, a case in which a manager stops driving the deposit device 50 and draws out the deposit device 50 by sliding it forward for the reason of repair will be described. When the manager draws out the front frame 51, the deposit device 50 slides forward along the first and second sliding bars 38, 39 and is drawn out.

When the deposit device 50 is drawn out forward, only the sliding frame 210 moves forward due to the tensile force of the elastic member 230, and the blocking plate 220 does not move ("first drawing-out operation"), and, when the deposit device 50 is further drawn out, the sliding frame 210 and the blocking plate 220 move forward altogether ("second drawing-out operation"), and the blocking plate 220 closes the upper portion of the dropping slot 35.

Hereinafter, the first drawing-out operation will be described with reference to FIGS. 13 to 15, and the second drawing-out operation will be described with reference to FIGS. 16 to 18.

Figure 13:
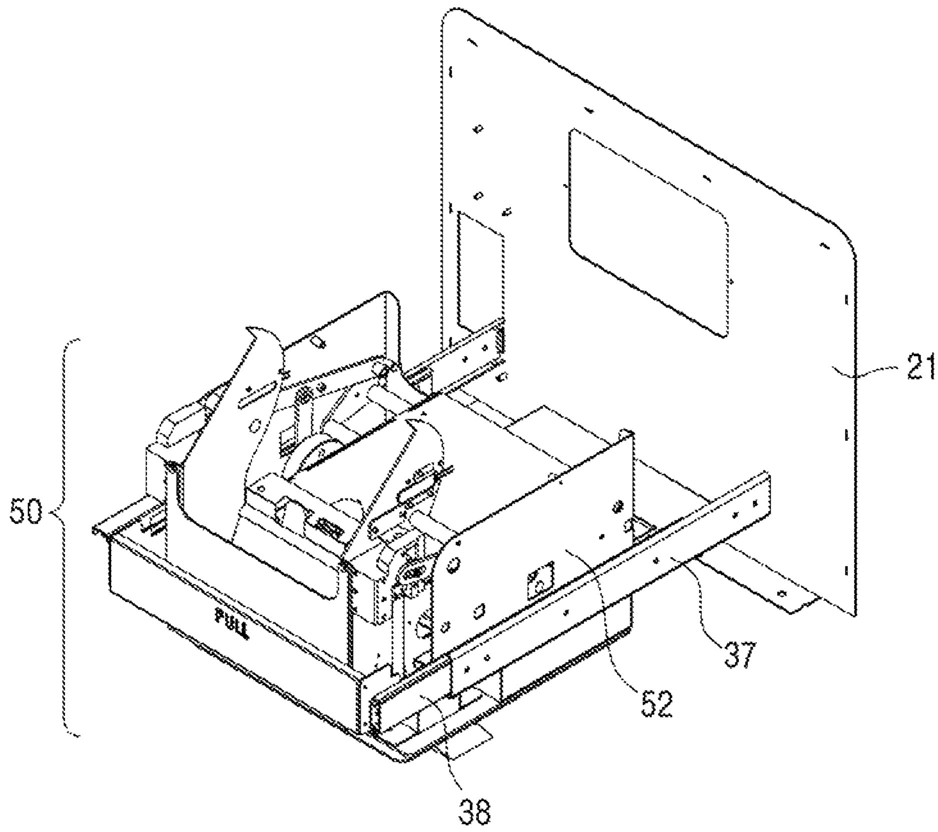
FIGS. 13, 14, and 15 are views illustrating a state while the deposit device is being drawn out.
Figure 14:
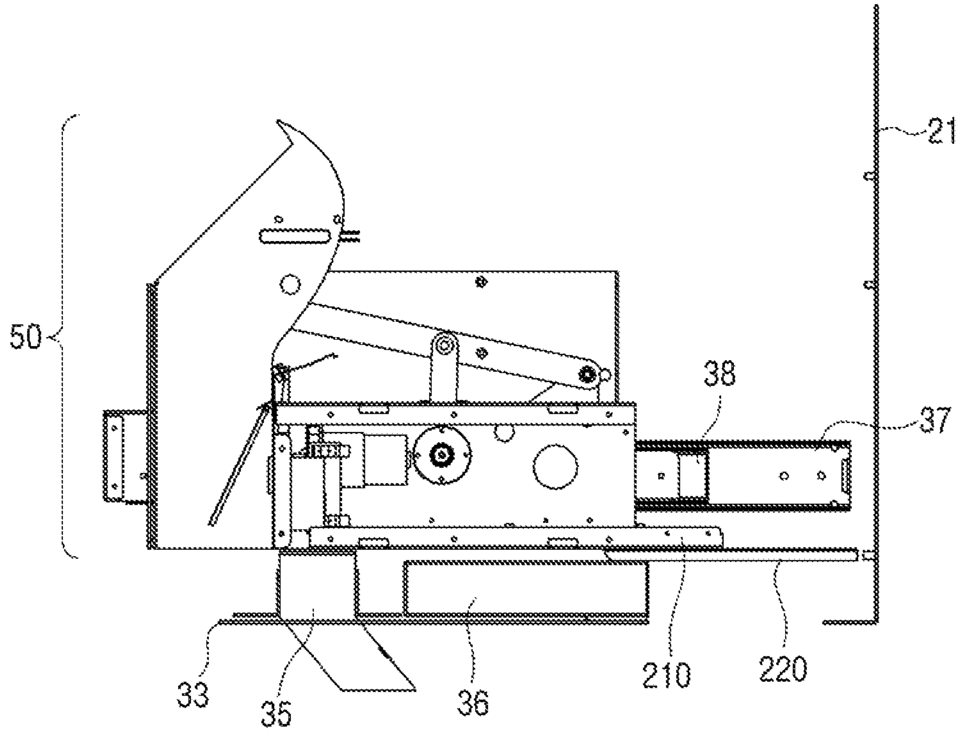
Figure 15:
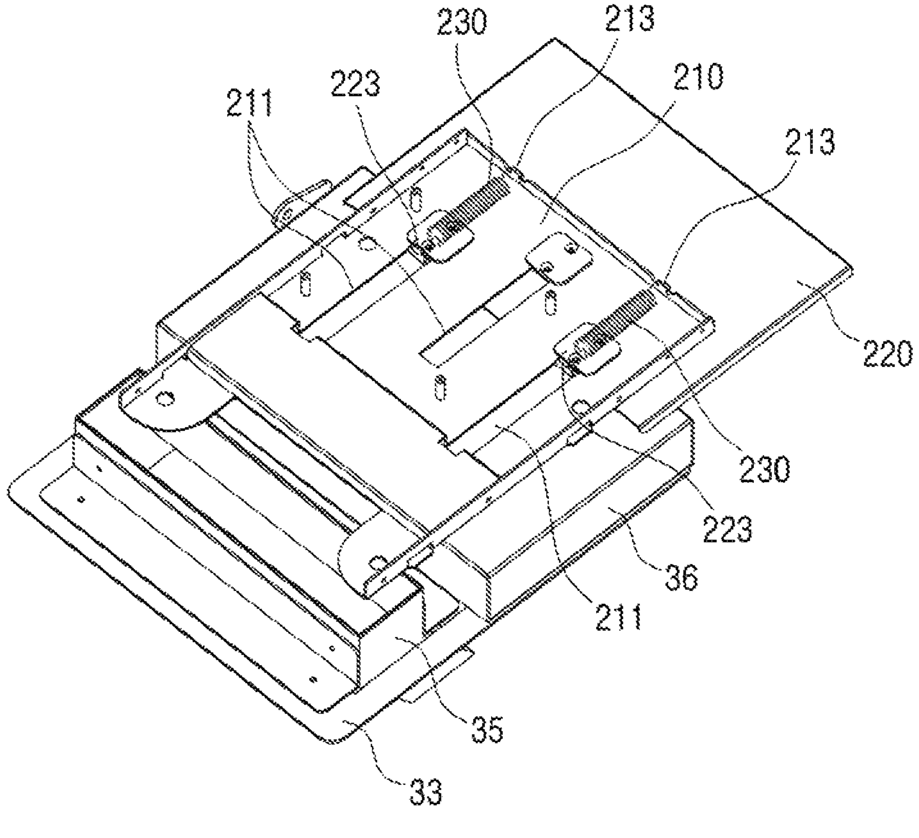

FIGS. 13 to 15 are views illustrating the first drawing-out operation. FIG. 13 is a perspective view, FIG. 14 is a side view, and FIG. 15 is a perspective view illustrating the sliding frame 210 and the blocking plate 220. It will be understood that, for convenience of explanation, main elements of the deposit device 50 are omitted from the drawings.

Referring to the drawings, when the manager pulls out the front frame 51 of the deposit device 50, the sliding frame 210 coupled to the deposit device 50 moves forward. In this case, since a force letting the sliding frame 210 move forward is exerted by the tensile force of the elastic member 230, the deposit device 50 can easily slide forward even when the user pulls out the front frame 51 with a weak force.

In this case, the tensile force of the elastic member 230 tends to move the blocking plate 220 backward, but the rear end of the blocking plate 220 is blocked by the vertical plate 21 and does not move backward. Therefore, the blocking plate 220 is not pushed back and stays in its position. Accordingly, in the first drawing-out operation, only the sliding frame 210 moves forward and the blocking plate 220 does not move and stays in its position as shown in FIGS. 13 and 15.

As can be seen from the comparison of FIGS. 12 and 15, the protrusion 225 of the blocking plate 220 moves from the front portion of the slot to the rear portion along the slot 211 of the sliding frame 210 by the first drawing-out operation, and, when the deposit device 50 is further pulled out with the protrusion 225 being moved to the rear portion of the slot 211, the second drawing-out operation of moving the sliding frame 211 and the blocking plate 220 altogether starts.

Figure 16:
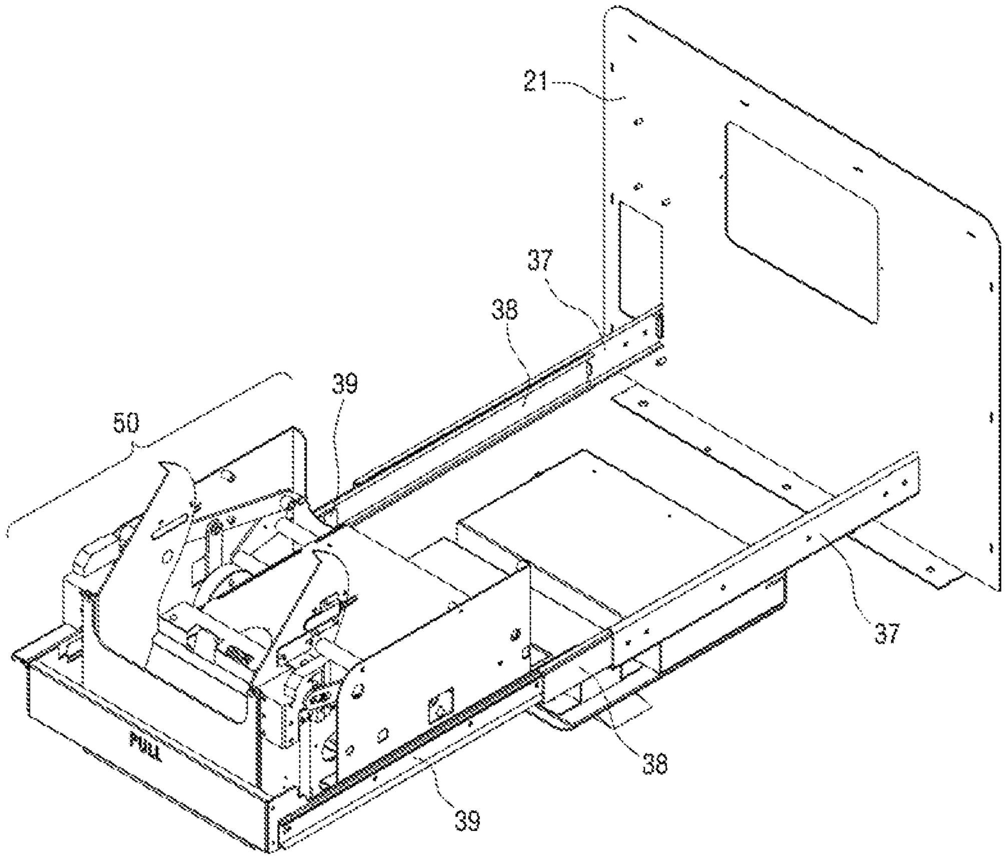
FIGS. 16, 17, and 18 are views illustrating a state in which the deposit device is completely drawn out.
Figure 17:
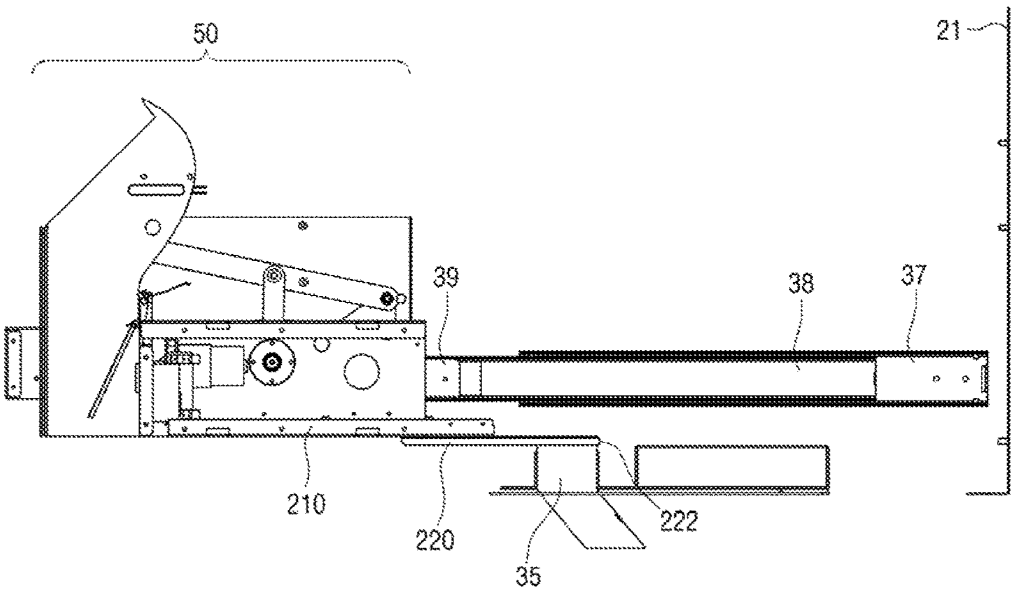
Figure 18:
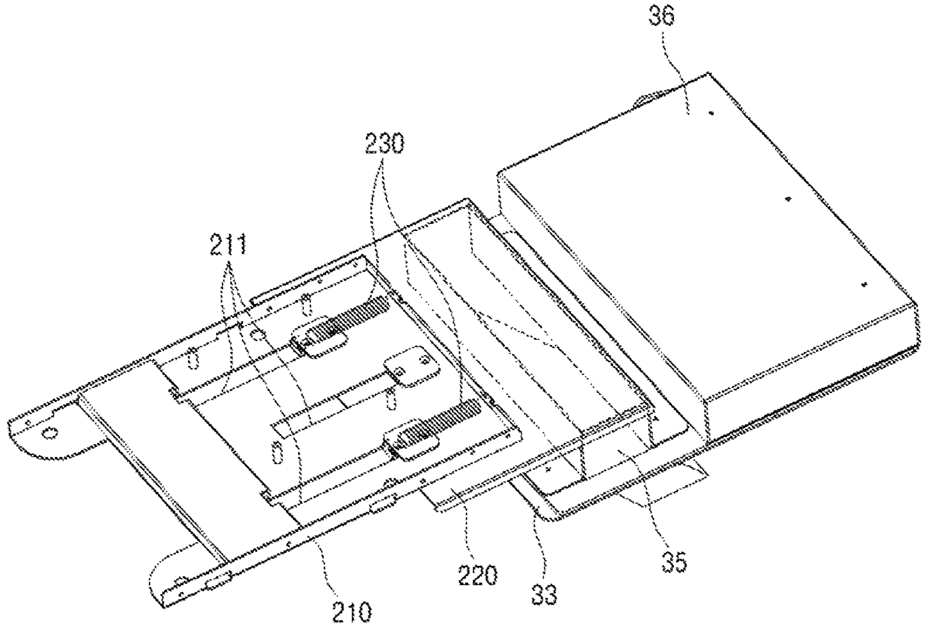

FIGS. 16 to 18 are views illustrating a state in which the deposit device is drawn out by the second drawing-out operation. FIG. 16 is a perspective view, FIG. 17 is a side view, and FIG. 18 is a perspective view illustrating the sliding frame 210 and the blocking plate 220.

When the deposit device 50 is further pulled forward as shown in FIGS. 16 to 18, the sliding frame 210 coupled to the deposit device 50 and the blocking plate 220 coupled thereto slide forward altogether, and accordingly, the blocking plate 220 closes the upper portion of the dropping slot 35. In this case, the rear bending portion 222 bending downward is formed on the rear end of the blocking plate 220, and the height of the lower end of the rear bending portion 222 is lower than the height of the upper end of the dropping slot 35. Therefor, as shown in FIGS. 17 and 18, the rear bending portion 222 collides with the upper end of the dropping slot 35, thereby preventing the blocking plate 220 from moving further forward. This state is a maximum drawing-out position of the deposit device 50.

According to the mechanism for opening/closing the dropping slot described above, the dropping slot is opened/closed in a mechanical method by combining the operation of drawing out the deposit device 50 and the operating of closing the dropping slot 35. Therefore, the structure is simpler than a related-art structure which closes the dropping slot 35 by using a separate electronic device such as a driving motor, and the dropping slot can be opened/closed more surely without causing a breakdown.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An automated cash receiving apparatus comprising:

a deposit device configured to receive and count a bill;

a front case and a rear case configured to surround a front portion and a rear portion of the deposit device, respectively;

a storage disposed under the deposit device to store the bill, and comprising a dropping slot to allow the bill dropping down from the deposit device to pass therethrough;

a sliding frame disposed between the deposit device and the storage; and a blocking plate disposed between the sliding frame and the storage, wherein the sliding frame is coupled to the deposit device, and is slidable forward and backward integrally with the deposit device, and the blocking plate is coupled to a lower portion of the sliding frame, and is slidable forward and backward relative to the sliding frame, wherein, when the deposit device is driven, the sliding frame and the blocking plate retreat, respectively, such that the dropping slot is opened, wherein, when the deposit device is drawn out forward in an idle state, the blocking plate slides forward, and closes an upper portion of the dropping slot.

2. The automated cash receiving apparatus of claim 1, wherein the sliding frame comprises one or more slots formed on a surface thereof in forward and backward directions, and wherein the blocking plate comprises one or more protruding member integrally coupled to the blocking plate and penetrating through the slot, and the blocking plate is guided by the slot and slides forward and backward.

3. The automated cash receiving apparatus of claim 2, further comprising one or more elastic members configured to couple the sliding frame and the blocking plate, wherein, when the deposit device is driven, a predetermined tensile force is applied to the elastic member.

4. The automated cash receiving apparatus of claim 3, wherein the elastic member has one end coupled to a rear end of the sliding frame, and the other end coupled to a front end of the blocking plate.

5. The automated cash receiving apparatus of claim 3, wherein, when the deposit device is drawn out forward, a first drawing-out operation in which only the sliding frame moves forward by the tensile force of the elastic member, and the blocking plate does not move, and a second drawing-out operation in which the sliding frame and the blocking plate move forward altogether and close the upper portion of the dropping slot are performed in sequence.

6. The automated cash receiving apparatus of claim 5, wherein a rear surface bending portion bending downward is formed on the rear end of the blocking plate, and wherein a height of a lower end of the rear surface bending portion is lower than an upper end of the dropping slot.

7. The automated cash receiving apparatus of claim 1, further comprising:

deposit device support plates disposed on left and right sides of an upper plate of the storage;

sliding bar support rails attached to the deposit device support plates, respectively;

first sliding bars coupled to the sliding bar support rails to be slidable forward and backward; and second sliding bars coupled to the first sliding bars to be slidable forward and backward, wherein the deposit device is integrally coupled to the second sliding bars.

8. The automated cash receiving apparatus of claim 1, wherein the deposit device comprises:

an upper bill insertion slot;

a counting device disposed under the bill insertion slot to count an inserted bill;

a bill dispensing slot disposed in front of the counting device; and a bill queue module disposed under the counting device to temporarily accommodate the bill passing through the counting device.

9. The automated cash receiving apparatus of claim 8, wherein the bill queue module is configured to operate in one of a bill queue mode in which a bill is accommodated until a bill deposit completion command is received from a user, a bill dropping mode in which the bill is dropped down to the dropping slot after the deposit completion command is received from the user, and a bill return mode in which the bill is accommodated until the user withdraws the bill according to a deposit cancellation command.

10. The automated cash receiving apparatus of claim 9, wherein the bill queue module comprises:

a bill seating portion on which the bill passing through the counting device is laid;

a horizontal plate disposed under the bill seating portion;

a vertical plate coupled to the horizontal plate at a front end of the horizontal plate;

a sliding plate disposed on a front portion of the vertical plate and slidable up and down;

one or more protrusions coupled to upper portions of the sliding plate by means of a hinge; and a driving motor disposed behind the vertical plate to slide the sliding plate.

11. The automated cash receiving apparatus of claim 10, wherein the bill queue module further comprises:

a slot formed on the sliding plate in a horizontal direction;

a cam interposed between the sliding plate and the vertical plate and coupled to a driving shaft of the driving motor; and a projection integrally coupled to the cam and penetrating through the slot, and wherein the projection moves in the slot in the horizontal direction by rotation of the driving shaft, and allows the sliding plate to move up and down.

12. The automated cash receiving apparatus of claim 11, further comprising guide portions attached to a left side and a right side of the sliding plate and having guide recesses formed therein, wherein the guide recesses are configured to surround a left end and a right end of the vertical plate on a front portion and a rear portion.

13. The automated cash receiving apparatus of claim 11, wherein, in the bill queue mode and the bill return mode, the projection ascends, such that the bill passing through the counting device stands aslant in contact with a bottom surface of the bill seating portion and an upper end of the projection, and wherein, in the bill dropping mode, the projection descends, such that the bill is dropped down due to self-weight.

* * * * *